2,719,836

PREPARATION OF POLYMERIC 2,3-DICHLOROPROPENE

Harry D. Anspon, Easton, Pa., assignor to General Aniline & Film Corporation, New York, N. Y., a corporation of Delaware No Drawing. Application November 17, 1950, Serial No. 196,360

4 Claims. (Cl. 260—91.7)

This invention relates to the preparation of polymeric 2,3-dichloropropene.

Allyl compounds, especially allyl alcohol and its esters are, in general, exceedingly difficult to polymerize. Heretofore, processes proposed for such polymerization required special catalysts for temporary conversion of the alcohol to a more readily polymerizable derivative. For example, U. S. Patent 2,402,484 indicates that organic esters such as allyl or β-chloroallyl acetate cannot be satisfactorily polymerized by heat, light or peroxide substances, but that polymerization can be effected in the presence of Cd or Hg salts of carboxy acids. Similar difficulties are indicated in U. S. Patent 2,431,224 in the polymerization of allyl alcohol in which the latter is polymerized by first converting it to an ortho ester of an inorganic acid such as boric, silic, titanic, etc., the ester polymerized, e. g. by heat, and the polymeric ester then hydrolyzed.

While copolymerization of 2,3-dichloropropene with acrylic compounds is known, polymerization of 2,3-dichloropropene alone has not been proposed heretofore. The monomer is not polymerized by heating in the presence of actinic light, as indicated by its preparation at elevated temperature in the presence of actinic light by chlorination of allyl chloride.

I have discovered that, while actinic light and heat fail to produce polymerization of 2,3-dichloropropene, this compound can be polymerized effectively by treatment of the monomer with a polymerization catalyst yielding free radicals, especially a peroxide such as benzoyl peroxide, peracetic acid, and ditertiary butyl peroxide, at temperatures from 0° C. to 120° C., the amount of catalyst being from 0.05 to 5 mol per cent of the amount of the monomer employed. The polymer thus produced is a clear, glassy, viscous substance, soluble in acetone and benzene, but precipitated from a benzene solution by dilution with hexane. It is useful as a plasticizer for other polymers such as polyvinyl chloride.

Preparation of the polymer in accordance with this invention is illustrated in the following example, wherein parts and percentages are by weight unless otherwise indicated.

Example 11.1 parts (0.1 mol part) of 2,3-dichloropropene were mixed with 0.53 part (0.002 mol) of benzoyl peroxide, and the mixture heated at 60° C. for 20 hours. A substantial decrease in volume was noted, indicating that polymerization had occurred.

11.1 parts (0.1 mol part) of 2,3-dichloropropene were similarly mixed with 0.0053 part (0.00002 mol part) of benzoyl peroxide and heated for 20 hours. No polymerization occurred. 0.53 part of benzoyl peroxide were then added to this mixture and the resulting solution, as well as the mixture first described above, were heated at 60° C. for a further period of 20 hours. It was found that the second, as well as the first, mixture had been polymerized by this treatment as indicated by a decrease in volume.

The two compositions were combined and subjected to distillation whereby 3.23 parts of 2,3-dichloropropene (B. P.: 90 to 91.5° C.) were recovered. Distillation was continued at 2 mm. of mercury absolute pressure whereby a higher boiling liquid having an index of refraction ($n_D^{25}$) of 1.5115 and boiling from 79 to 81° C. at the aforesaid pressure, was obtained. The latter was apparently a dimer of the starting material. The residue of this distillation was a clear brown glassy, sticky material amounting to 12.2 parts and corresponding to 55% theoretical yield of polymer, based on the initial amount of 2,3-dichloropropene employed. The polymer was soluble in acetone and benzene, and was precipitated from solution in the latter solvent upon dilution with an excess of hexane. The reduced viscosity in benzene solution was 0.028, where "reduced viscosity" has the meaning proposed (mid-page) in J. Colloid Science 1, 265 (1946).

Instead of benzoyl peroxide, employed in the example, other catalysts yielding free radicals, especially organic peroxides such as ditertiary butyl peroxide and peracetic acid, can be employed. The optimum temperature for polymerization depends on the catalyst used. In general, suitable temperatures range from 0° C. to 120° C. With benzoyl peroxide, temperatures from 50 to 120° C. are preferred. Suitable catalyst concentrations range from 0.5 to 5 mol per cent of the amount of 2,3-dichloropropene, 2 to 3 mol per cent being the preferred range.

Inert solvents or dispersion media can be employed in the polymerization reaction. Thus, the polymerization can be effected in a similar manner in solvents for 2,3-dichloropropene such as benzene or hexane. The 2,3-dichloropropene can also be dispersed as an emulsion in an aqueous solution of a dispersing agent such as sulfonated formaldehyde-naphthalene condensation product, alkyl aryl sulfonates, sulfonated fatty acids, or ethylene oxide condensation products of alkyl phenols and the resulting dispersion subjected to polymerization. Solution polymerization or emulsion polymerization is effected by means of the polymerization catalysts described above at temperatures of 0 to 120° C. similar to those employed for mass polymerization as indicated above.

Polymeric 2,3-dichloropropene obtained in accordance with this invention is valuable as a plasticizer for polyvinyl chloride and polyvinylidene chloride resins.

Copolymers of 2,3-dichloropropene with maleic anhydride for example, employing equimolecular amounts of the monomers, can be prepared by the same procedure as that described in the example, the copolymer being produced in a yield of 24% of theory and containing 44 mol per cent of maleic anhydride units and 56% of 2,3-dichloropropene units.

Variations and modifications which will be obvious to those skilled in the art can be made in the procedures hereinbefore described, without departing from the scope or spirit of the invention.

I claim:

1. A process for preparing polymerized 2,3-dichloropropene, which consists in mixing 2,3-dichloropropene with 0.5 to 5 mol per cent of a free radical-yielding polymerization catalyst, and maintaining the mixture at a temperature from 0 to 120° C. at which the catalyst liberates free radicals, until polymerization occurs.

2. A process for preparing polymerized 2,3-dichloropropene, which consists in mixing 2,3-dichloropropene with 0.5 to 5 mol per cent of an organic peroxide polymerization catalyst, and maintaining the mixture at a temperature from 0 to 120° C. at which the catalyst liberates free radicals, until polymerization occurs.

3. A process for preparing polymerized 2,3-dichloropropene, which consists in mixing 2,3-dichloropropene with 2 to 3 mol per cent of benzoyl peroxide, and maintaining the mixture at a temperature from 50 to 120° C. at which the catalyst liberates free radicals, until polymerization occurs.

4. A process for preparing polymeric 2,3-dichloropropene, which consists in heating a mixture of 2,3-dichloropropene with 2 to 3 mol per cent of benzoyl peroxide at a temperature of about 60° C. for 20 to 40 hours, and separating the polymer from the resulting reaction mixture.

References Cited in the file of this patent

UNITED STATES PATENTS 2,571,883   Hulse _____ Oct. 16, 1951

FOREIGN PATENTS 576,022   Great Britain _____ Mar. 15, 1946